United States Patent
Takashima

(10) Patent No.: US 6,884,448 B2
(45) Date of Patent: Apr. 26, 2005

(54) SPONGE CAKE PREMIX AND METHOD OF MANUFACTURING SPONGE CAKE BY USING SAID PREMIX

(75) Inventor: Hiroe Takashima, Chigasaki (JP)

(73) Assignee: Nagatanien Co., Ltd., Tokyo (JP)

( * ) Notice: Subject to any disclaimer, the term of this patent is extended or adjusted under 35 U.S.C. 154(b) by 233 days.

(21) Appl. No.: 09/851,070

(22) Filed: May 8, 2001

(65) Prior Publication Data

US 2001/0055638 A1 Dec. 27, 2001

(30) Foreign Application Priority Data

May 9, 2000 (JP) ........................................ 2000-135997

(51) Int. Cl.$^7$ ................................................ A21D 6/00
(52) U.S. Cl. ........................ 426/128; 426/243; 426/555; 426/552; 426/554; 426/558; 426/559; 426/577; 426/578
(58) Field of Search ................................ 426/128, 243, 426/555, 552, 554, 558, 559, 577, 578

(56) References Cited

U.S. PATENT DOCUMENTS

| | | | | |
|---|---|---|---|---|
| 3,567,461 A | * | 3/1971 | Nirnecke | 426/555 |
| 3,653,917 A | * | 4/1972 | Wahba et al. | 426/552 |
| 3,875,309 A | * | 4/1975 | Johannes | 426/555 |
| 4,847,100 A | | 7/1989 | Kanafani et al. | |
| 4,857,353 A | * | 8/1989 | Jackson et al. | 426/554 |
| 4,929,465 A | | 5/1990 | Kanafani et al. | |
| 4,965,081 A | * | 10/1990 | Lazarus | 426/242 |
| 5,015,486 A | * | 5/1991 | Franssell et al. | 426/243 |
| 5,049,398 A | | 9/1991 | Saari et al. | |

FOREIGN PATENT DOCUMENTS

| | | | |
|---|---|---|---|
| EP | 0367031 A3 | | 5/1990 |
| EP | 0505477 B1 | | 9/1992 |
| JP | 409037706 | * | 8/1995 |
| JP | 797950 | | 10/1995 |
| JP | 8159 | | 1/1996 |
| JP | 8-38028 | | 2/1996 |
| JP | 10056946 | | 3/1998 |
| JP | 11113478 | | 4/1999 |
| JP | 2000125795 | * | 5/2000 |
| KR | 2000-13079 | | 3/2000 |

OTHER PUBLICATIONS

Feb. 20, 2002 German search report, and English–language translation thereof, in counterpart German application No. 101 21 857.5.

Nov. 19, 2001 official action in counterpart British application No. GB 0111209.3.

Dec. 14, 2001 Taiwanese official notice, and English–language translation thereof, in Taiwanese application No. 09011019505.

Jul. 28, 2003 Korean Office Action and English–language translation thereof in connection with Korean Application No. 10–2001–0024789.

* cited by examiner

*Primary Examiner*—N. Bhat
(74) *Attorney, Agent, or Firm*—John P. White; Cooper & Dunham LLP

(57) ABSTRACT

The present invention is directed to a sponge cake premix that can be cooked easily with a microwave oven to prepare a sponge cake. A batter prepared by adding a thermocoagulation protein to a sponge cake premix containing as a main ingredient a cereal powder consisting of starch and a pregelatinized starch is cooked under heat with a microwave oven to obtain a sponge cake that permits eliminating the gum-like hard texture inherent in conventional sponge cakes of this type and exhibits a light and soft texture. The obtained sponge cake is free from bake shrinkage and exhibits a good-looking voluminous appearance.

16 Claims, No Drawings

SPONGE CAKE PREMIX AND METHOD OF MANUFACTURING SPONGE CAKE BY USING SAID PREMIX

CROSS-REFERENCE TO RELATED APPLICATIONS

This application is based upon and claims the benefit of priority from the prior Japanese Patent Application No. 2000-135997, filed May 9, 2000, the entire contents of which are incorporated herein by reference.

BACKGROUND OF THE INVENTION

1. Field of the Invention

The present invention relates to a premix for sponge cakes, steamed bread, etc., that can be cooked easily at home, particularly for that using a microwave oven, resulting in a cooked cake having an excellent texture and not shrinking.

2. Description of the Related Art

Home cooking of sponge cakes and steamed bread is popular, and for this, a sponge cake premix aimed at microwave ovens is commercially available.

The main ingredients of a sponge cake premix includes flour, saccharides, raising agents, and additional ingredients of sugar, powdered milk, seasonings, oil, fat, food colorings, emulsifying agents, and aromas. Water is added to the above ingredients, which are then kneaded together, formed into a mass, and baked in an oven to produce the cake.

However, the texture and volume of conventionally-made sponge cakes have the tendency to be less than satisfactory. To be more specific, when baked in a microwave oven, they exhibited a gummy viscoelasticity and had a hard texture. After baking, the cakes took on a moist-free texture when cool, i.e., the moist is somewhat removed from the cakes, and found to be somewhat different from the melt-in-the-mouth qualities expected from a sponge cake.

Further, it was difficult to obtain a light and soft voluminous feel for a cake baked in these fashion. Bearing this is mind, a satisfactory sponge cake premix has yet to be developed.

The reason for the unsatisfactory texture and voluminous feel of the sponge cake is said to reside mainly in the protein denaturation of gluten of the raw material flour. To be more specific, in a conventional sponge cake premix using flour as the raw material, protein denaturation is considered to take place in the gluten contained in the premix, so as to cause the cooked sponge cake to exhibit a hard texture tinged with a gum-like viscoelasticity. As a measure for overcoming the difficulty, proposed is a method of using flour low in protein content (see Japanese Patent Publication (Kokoku) No. 7-97950). Also proposed is a method of using heat-treated flour (see Japanese Patent Disclosure (Kokai) No. 8-159). Further, various proposals have been made including a method of adding an oil and fat, an emulsifying agent and saccharides to the raw material.

The sponge cake prepared by the methods exemplified above permits improving the texture to some extent. However, a sufficient improvement has not yet been achieved, and consumers have requested that the texture be further improved.

In any of the methods exemplified above, flour is used as the main raw material of the cake premix. Naturally, the raw material flour contains gluten, which is thermally denatured when heated by microwaves within a microwave oven, so as to form a mesh structure of the sponge texture of the cake. However, the mesh structure actually causes the cooked sponge cake to exhibit a hard gum-like texture, resulting in the failure to produce a light and soft voluminous feel.

Under the circumstances, it is considered to prepare a sponge cake premix using flour having a low gluten or protein content. In the case of using such a flour, it is certainly possible to eliminate or lower the hard gum-like texture of the cooked sponge cake. In this case, however, another difficulty is encountered. Specifically, the mesh structure of the sponge cake serves to hold the gas generated from the expanding agent so as to support the sponge skeleton of the cake. In the case of using the particular flour noted above, however, the mesh structure is not formed sufficiently, resulting in a marked reduction in the role of supporting the sponge skeleton of the cake. It follows that it is impossible to maintain the volume of the sponge cake immediately after baking, giving rise to a large bake shrinkage. As a result, another problem is generated.

BRIEF SUMMARY OF THE INVENTION

The present invention is intended to obtain a sponge cake exhibiting a light and soft voluminous feel, capable of maintaining its volume immediately after baking and, thus, small in the bake shrinkage, and provides a sponge cake premix containing, as a main ingredient, a cereal powder consisting of starch and pregelatinized starch in place of flour. Further, batter is prepared by adding a thermocoagulation protein to the sponge cake premix and cooked under heat so as to obtain a sponge cake excellent in texture.

Another object of the present invention is to manufacture a sponge cake having a voluminous feel, capable of maintaining the volume of the sponge cake immediately after baking and, thus, small in bake shrinkage. A sponge cake excellent in texture is manufactured by preparing a batter having a viscosity of 100 to 300 Pa·s by adding a thermocoagulation protein and, as required, milk and water to starch and pregelatinized starch used as a cereal powder, followed by cooking the batter under heat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Where a sponge cake premix containing flour is cooked under heat using a microwave oven, the gluten of the flour is heated rapidly and excessively so as to be denatured. Also, the gelatinization of the starches is rendered insufficient by the rapid heating. As a result, the sponge texture of the cake using the particular sponge cake premix is caused to exhibit a strong viscoelasticity inherent in gluten. Also, the expansion of the raw materials is suppressed by the shrinking force of gluten, with the result that the raw material fails to be swollen sufficiently. It follows that the sponge cake is caused to exhibit an undesirable gum-like texture, compared with the sponge cake prepared by gradually heating the raw materials with an oven.

Under the circumstances, starch and pregelatinized starch are used in the present invention as raw materials of the sponge cake premix in place of flour. Further, a thermocoagulation protein such as a powdered egg is used as a substitute for wheat protein, which is not coagulated under heat.

The term "sponge cake premix" used herein represents the sponge cake premix of, for example, a sponge cake, a chiffon cake, steamed bread, hot cakes or muffins.

The term "cereal powder" used herein represents a cereal powder used in a sponge cake premix for constituting the sponge structure of the sponge cake. The cereal powder used in the present invention consists of starch and pregelatinized starch. The starches used in the present invention includes various starches such as wheat starch, corn starch, tapioca starch, potato starch and rice starch, and a modified starch prepared by using the above-noted starches excluding pregelatinized starch as the raw material. These starches can be used singly or in the form of a mixture of a plurality of these starches. Particularly, it is desirable to use wheat starch, corn starch, starch phosphate and crosslinked wheat starch.

Pregelatinized starch is a kind of modified starch that is readily converted into a viscous starch paste if water is added thereto at room temperature. For preparing the pregelatized starch, used as raw materials are starches such as wheat starch, corn starch, tapioca starch, potato starch and rice starch exemplified above and the modified starches prepared from there starches. Water is added to there raw materials and there raw materials are heated so as to achieve gelatinization of there raw materials, followed by dehydrating and drying the gelatinized modified starches. These pregelatinized starches can be used singly or in the form of a mixture of a plurality of pregelatinized starches. The preferred pregelatinized starches include pregelatinized wheat starch and pregelatinized corn starch.

A mesh structure of gluten is not formed even if a batter, which is prepared by adding water to a sponge cake premix using, as the raw material, a cereal powder that does not contain gluten, is heated. Therefore, the heated batter is incapable of holding the gas generated from an expanding agent, with the result that the formation of the sponge structure is quite insufficient. In order to overcome this difficulty, a pregelatinized starch is added in the present invention so as to cause the batter to exhibit an appropriate viscosity, thereby holding the gas generated from the expanding agent of the raw material within the batter.

Even if the mixing ratio of the pregelatinized starch in the raw material cereal powder is set constant, the batter exhibits different degrees of viscosity, depending on the kind of pregelatinized starch and the amount of water added to the sponge cake premix. In general, it is possible to prepare a batter having a desired viscosity of 100 to 300 Pa·s by setting the mixing amount of the pregelatinized starch in the entire cereal powder at 25 to 55% by weight.

If the mixing amount of the pregelatinized starch in the entire cereal powder is smaller than 25% by weight, the batter fails to exhibit a sufficient viscosity even if the smallest amount of water required for gelatinization of the starch is added. As a result, it is impossible to hold the gas generated from the expanding agent by the heating in the cooking step, in a fine cellular state. It follows that the cooked sponge cake is caused to have highly irregular cells. Also, in the event of such a situation, the gas pressure can cause the sponge cake to jump out of the container.

If the mixing amount of the pregelatinized starch exceeds 55% by weight, the viscosity of the batter is rendered excessively high even if water is added in an amount larger than that required for gelatinization of the starch. As a result, the gas generated from the expanding agent is incapable of uniformity expanding the batter. In this case, the sponge texture is not developed sufficiently, leading to a sponge cake poor in its voluminous feel.

When it comes to texture, the starch used in the present invention exhibits a melt-in-the-mouth quality better than flour. However, the starch is not sufficiently gelatinized by microwave oven heating and, thus, the effect of starch was not sufficiently exhibited in the past. Under the circumstances, a pregelatinized starch is used as one of the ingredients in the present invention so as to overcome the insufficient gelatinization performed by microwave heating and, thus, to improve the texture.

Further, in order to prepare a sponge cake using the starch and the pregelatinized starch described above, a single or a plurality of thermocoagulation proteins are added, as a substitute for the conventionally-used gluten, to the starch and the pregelatinized starch specified in the present invention. The thermocoagulation proteins used in the present invention consist of proteins containing albumin and globulin, including, for example, egg white, casein, and whey protein. It is possible to premix these thermocoagulation proteins into the sponge cake premix. Alternatively, it is possible to add a suspension of the proteins noted above, a whole egg liquid or an egg white liquid as a liquid ingredient for preparing a batter. Further, water is added as required. These thermocoagulation proteins serve to fix the cellular sponge structure formed by coagulation during heating, using microwaves in place of the previously-used gluten, so as to maintain the swollen state of the sponge cake and, thus, to prevent bake shrinkage.

To be more specific, it is considered reasonable to understand that, in the thermocoagulation protein, the protein is coagulated and fixed, with the result that the force for diminishing the space formed by the expanding gas is not exerted so as to maintain a satisfactory swollen state. The mixing amount of the thermocoagulation protein, which should be controlled appropriately depending on the desired state of the sponge cake, should fall within a range of between 10 and 120% by weight, preferably between 20 and 100% by weight, and more preferably between 30 and 80% by weight, based on the amount of the cereal powder consisting of the starch and the pregelatinized starch.

It is desirable for the resultant batter to have a viscosity falling within a range of between 100 and 300 Pa·s. If the viscosity of the batter is less than 100 Pa·s, the gas generated in the swelling step during baking tends to be dissipated, resulting in failure to obtain a satisfactory sponge. On the other hand, if the viscosity of the batter exceeds 300 Pa·s, the swelling is inhibited.

The viscosity of the batter is critically related to the sponge texture of the cake. It is necessary for the batter, which is prepared by adding water to a sponge cake premix, to have a suitable range of viscosity in order to hold the gas generated from the swelling agent within the batter.

In the present invention, the viscosity of the batter held at 25° C., and made uniform by stirring with a spoon for 90 seconds, is measured by a rotational viscometer so as to obtain the viscosity specified in the present invention. It is desirable to use a rotational viscometer of RB80L type (full scale torque of 67.4 $\mu$N·m and rotor of No. 4) manufactured by Tokisangyo for obtaining the viscosity of the batter. The viscosity of the batter is measured by this rotational viscometer under the conditions given below:

Measuring temperature: 25° C.

Rotating speed of rotor: 1.5 rpm

Measuring time: 3 minutes after start-up of rotation

If at least one kind of water-insoluble dietary fiber selected from the group consisting of cellulose, wheat bran, and sugar beet fiber are added to the sponge cake premix, the water-insoluble dietary fibers absorb water within the batter so as to disperse water uniformly. As a result, it is possible to suppress nonuniform heating when the batter is heated within a microwave oven. Further, if water-insoluble dietary fibers are added, the dietary fibers produce a physical resistance function when the batter is swollen so as to prevent the batter from being swollen nonuniformly and to permit baking the sponge cake such that the upper surface of the sponge cake is rendered substantially flat.

In order to obtain the effects described above, it is desirable for the water-insoluble dietary fibers to be added in an amount of 5 to 15% by weight based on the amount of the cereal powder contained in the sponge cake premix. If the addition amount is smaller than 5% by weight, it is impossible to obtain the above-noted effects produced by the addition of the water-insoluble dietary fibers. On the other hand, if the addition amount exceeds 15% by weight, the swelling itself of the sponge cake is suppressed so as to impair the texture.

In addition to the ingredients described above, it is possible to appropriately add additional ingredients such as saccharides, powdered milk, seasonings, fat and oil, food coloring, emulsifying agents, and aromas, to the sponge cake premix of the present invention. It is also possible to add solid ingredients such as nuts and chocolate chips to the sponge cake premix of the present invention.

The types and amounts of these additional ingredients are controlled appropriately depending on the desired qualities of the sponge cake. When it comes to the expanding agent, it is particularly desirable to use a baking powder containing sodium bicarbonate as a main ingredient, that promptly produces a swelling effect when the batter is baked in a microwave oven. The mixing amount of the baking powder should be 3 to 30% by weight based on the amount of starch.

The sponge cake premix of the present invention is formed into a batter having a viscosity of 100 to 300 Pa·s by using a thermocoagulation protein liquid, a combination of a thermocoagulation protein and milk, a combination of a thermocoagulation protein liquid and water, a combination of a thermocoagulation protein liquid, milk and water, a combination of a thermocoagulation protein and milk, a combination of a thermocoagulation protein and water, or a combination of a thermocoagulation protein, milk and water. Further, where a thermocoagulation protein is contained in the sponge cake premix, it is possible to prepare a batter by using milk and/or water in addition to the sponge cake premix. A sponge cake can be prepared easily even at home by heating the batter thus prepared in a microwave oven.

In the sponge cake premix of the present invention, it is not absolutely necessary to exclude the mixing of gluten. In other words, it is acceptable to use gluten in a small amount such that the sponge structure of the cake is not formed by the added gluten. Naturally, it is also acceptable to mix a small amount of flour in the sponge cake premix of the present invention.

Experiment:

A cake mix was prepared using the ingredients shown in Table 1. Specifically, the whole cereal powder consisted of wheat starch and pregelatinized starch. The pregelatinized starch, which was selected from the group consisting of a pregelatinized wheat starch (A), a pregelatinized corn starch (B), a pregelatinized tapioca starch (C), a pregelatinized waxy corn starch (D), and a pregelatinized potato starch (E), was used in an amount of 20 to 60% based on the whole cereal powder.

TABLE 1 unit: g

| Raw material composition | Amount used |
| --- | --- |
| Whole cereal powder (wheat starch + pregelatinized starch) | 12 |
| Pregelatinized starch in whole cereal powder | 20 to 60% by weight of whole cereal powder |
| Sugar | 20 |
| Powdered fat and oil | 4 |
| Powdered milk | 1 |
| Table salt | 0.5 |
| Whole egg powder | 13 |

A cake batter was prepared as shown in Tables 2 to 4 by using the cake mix described above, and a batter for measuring the viscosity was prepared by using the batter for the cake. The amount of water added greatly affected the viscosity of the batter. If the amount of water added is small, the gelatinization of the starch is rendered insufficient so as to make the texture poor and to exhibit a rough sponge texture. On the contrary, if the amount of water added is excessively large, the sponge is collapsed by the water, resulting in a failure to maintain the swollen state of the batter. Such being the situation, water was added in an amount of 30 g, 40 g and 50 g, as shown in Tables 2, 3 and 4, respectively. The viscosity of each of these batters was measured and shown in Tables 2 to 4.

Further, a premix for a cake having the composition equal to that of the batter for viscosity measurement was prepared separately. 3 g of baking powder was added to the premix, and the resultant premix composition was put in a substantially cylindrical porcelain cup having a diameter of 8 cm, a depth of 8 cm, and an inner volume of 330 ml. Further, water was added in an amount of 30 g, 40 g or 50 g as in the step of measuring the viscosity to the cake mix and the water-added cake mix was stirred so as to obtain a batter containing the baking powder.

Then, the batter was heated for 2 minutes in a domestic microwave oven having an output of 500 W so as to prepare a sponge cake and evaluate the state of the swelling.

The swelling of the sponge cake was visually evaluated as follows:

⊚: The sponge was very fine and the sponge cake was swollen to reach the brim of the cup or to form a hemispherical end portion expanding upward from the brim of the cup;

◯: The sponge was fine and the sponge cake was swollen uniformly. However, the swelling was somewhat insufficient or the sponge cake was excessively swollen to some extent;

Δ: The sponge was rough. Also, the sponge cake was swollen nonuniformly or insufficiently.

Further, the texture was judged by 10 people on the basis of the evaluation standards given below, and the average of all the results is shown in Tables 2 to 4:

Evaluation standards:

5: The sponge cake, when eaten, felt prominently soft and moist. Also, the sponge cake was cut by the teeth and melted within the mouth highly satisfactorily.

4: The sponge cake, when eaten, felt soft, though the soft feeling was not prominent. Also, the sponge cake was cut by the teeth and melted within the mouth somewhat satisfactorily.

3: The sponge cake was substantially equal in texture to the conventional sponge cake. The texture was not particularly soft. The sponge cake was also substantially equal to the conventional sponge cake in the cutting by the teeth and the melting in the mouth.

2: The texture was somewhat moist-free or sticky. Also, the cutting by the teeth and the melting in the mouth were somewhat poor.

1: The texture was considerably moist-free or sticky and, thus, the sponge cake was not tasty. The cutting by the teeth and the melting in the mouth were also poor.

Tables 2, 3 and 4 show the viscosity of the batter, the swelling of the sponge cake, and the texture of the sponge cake thus evaluated:

TABLE 2

Amount of water added: 30 g
Batter viscosity: Pa · s

| Type of pregelatinized starch | | Pregelatinized starch mixing amount | | | | |
|---|---|---|---|---|---|---|
| | Evaluation items | 20% | 30% | 40% | 50% | 60% |
| A | Batter viscosity | 128 | 139 | — | — | — |
| | Evaluation of swelling | ⊙ | ⊙ | — | — | — |
| | Evaluation of texture | 3.6 | 4.8 | — | — | — |
| B | Batter viscosity | 115 | 386 | — | — | — |
| | Evaluation of swelling | ○ | ○ | — | — | — |
| | Evaluation of texture | 3.1 | 2.4 | — | — | — |
| C | Batter viscosity | 56 | 214 | — | — | — |
| | Evaluation of swelling | Δ | ⊙ | — | — | — |
| | Evaluation of texture | 1.3 | 3.9 | — | — | — |
| D | Batter viscosity | 88 | 237 | — | — | — |
| | Evaluation of swelling | Δ | ⊙ | — | — | — |
| | Evaluation of texture | 1.4 | 3.9 | — | — | — |
| E | Batter viscosity | 66 | 228 | — | — | — |
| | Evaluation of swelling | Δ | ⊙ | — | — | — |
| | Evaluation of texture | 1.3 | 4.1 | — | — | — |

A: pregelatinized wheat starch
B: pregelatinized corn starch
C: pregelatinized tapioca starch
D: pregelatinized waxy corn starch
E: pregelatinized potato starch

TABLE 3

Amount of water added: 40 g
Batter viscosity: Pa · s

| Type of pregelatinized starch | | Pregelatinized starch mixing amount | | | | |
|---|---|---|---|---|---|---|
| | Evaluation items | 20% | 30% | 40% | 50% | 60% |
| A | Batter viscosity | — | 84 | 165 | — | — |
| | Evaluation of swelling | — | ○ | ⊙ | — | — |
| | Evaluation of texture | — | 3.1 | 4.9 | — | — |
| B | Batter viscosity | — | 160 | 343 | — | — |
| | Evaluation of swelling | — | ⊙ | ○ | — | — |
| | Evaluation of texture | — | 4.6 | 2.5 | — | — |
| C | Batter viscosity | — | 111 | 298 | — | — |
| | Evaluation of swelling | — | ⊙ | ⊙ | — | — |
| | Evaluation of texture | — | 3.6 | 4.2 | — | — |
| D | Batter viscosity | — | 112 | 174 | — | — |
| | Evaluation of swelling | — | ⊙ | ⊙ | — | — |
| | Evaluation of texture | — | 3.3 | 4.4 | — | — |
| E | Batter viscosity | — | 110 | 299 | — | — |
| | Evaluation of swelling | — | ⊙ | ⊙ | — | — |
| | Evaluation of texture | — | 3.2 | 4.3 | — | — |

A: pregelatinized wheat starch
B: pregelatinized corn starch
C: pregelatinized tapioca starch
D: pregelatinized waxy corn starch
E: pregelatinized potato starch

TABLE 4

Amount of water added: 50 g
Batter viscosity: Pa · s

| Type of pregelatinized starch | | Pregelatinized starch mixing amount | | | | |
|---|---|---|---|---|---|---|
| | Evaluation items | 20% | 30% | 40% | 50% | 60% |
| A | Batter viscosity | — | — | 96 | 200 | 320 |
| | Evaluation of swelling | — | — | ○ | ⊙ | ○ |
| | Evaluation of texture | — | — | 3.2 | 4.1 | 2.6 |
| B | Batter viscosity | — | — | 220 | 280 | 398 |
| | Evaluation of swelling | — | — | ⊙ | ⊙ | Δ |
| | Evaluation of texture | — | — | 4.6 | 4.1 | 1.9 |
| C | Batter viscosity | — | — | 215 | 333 | 400 or more |
| | Evaluation of swelling | — | — | ⊙ | ○ | Δ |
| | Evaluation of texture | — | — | 3.8 | 2.6 | 1.3 |
| D | Batter viscosity | — | — | 98 | 213 | 301 |
| | Evaluation of swelling | — | — | ○ | ⊙ | ○ |
| | Evaluation of texture | — | — | 3.2 | 3.5 | 2.3 |
| E | Batter viscosity | — | — | 198 | 367 | 400 or more |
| | Evaluation of swelling | — | — | ⊙ | ○ | Δ |
| | Evaluation of texture | — | — | 3.7 | 3.3 | 1.2 |

A: pregelatinized wheat starch
B: pregelatinized corn starch
C: pregelatinized tapioca starch
D: pregelatinized waxy corn starch
E: pregelatinized potato starch As is apparent from Tables 2 to 4, if the viscosity of the batter falls within the range of between 100 and 300 Pa·s, it is possible to obtain a sponge cake satisfactory in its swelling, softness, moistness and satisfactory in its cutting by the teeth and melting in the mouth. It is also apparent that a satisfactory sponge cake can be obtained in the case where the mixing amount of the pregelatinized starch falls within the range of between 25 and 55% by weight based on the whole starch.

EXAMPLE 1

A cake premix of the composition given below was mixed by an ordinary method so as to obtain a cake premix for cooking by a microwave oven:

| | |
|---|---|
| Wheat starch | 6 g |
| Pregelatinized wheat starch | 5 g |
| Pregelatinized corn starch | 1 g |
| Sugar | 20 g |
| Baking powder | 3 g |
| Powdered fat and oil | 4 g |
| Table salt | 0.2 g |
| Powdered skimmed milk | 1 g |
| Emulsifier | 1 g |

The cake mix thus prepared was put in a substantially cylindrical porcelain mug cup having a diameter of 8 cm, a depth of 8 cm and an inner volume of 330 ml, followed by adding about 50 g of chicken egg and sufficiently stirring the resultant mixture so as to prepare a cake batter. The viscosity of the batter was found to be 220 Pa·s. Then, the batter was heated for 2 minutes in a microwave oven having an output of 500 W so as to obtain a sponge cake. The sponge cake exhibited a fine, uniform sponge texture and was found to be satisfactory in the cutting by the teeth and the melting in the mouth. Also, the sponge cake maintained the swollen state immediately after cooking.

EXAMPLE 2

A cake premix of the composition given below was mixed by an ordinary method so as to obtain a cake premix for cooking by a microwave oven:

| | |
|---|---|
| Potato starch | 7.5 g |
| Pregelatinized corn starch | 5 g |
| Sugar | 18.5 g |
| Casein | 10 g |
| Baking powder | 3 g |
| Powdered fat and oil | 4 g |
| Table salt | 0.2 g |
| Powdered skimmed milk | 0.5 g |
| Emulsifier | 1 g |

The cake mix thus prepared was put in a substantially cylindrical porcelain mug cup having a diameter of 8 cm, a depth of 8 cm and an inner volume of 330 ml, followed by adding 40 ml of water and sufficiently stirring the resultant mixture so as to prepare a cake batter. The viscosity of the batter was found to be 274 Pa·s. Then, the batter was heated for 2 minutes in a microwave oven having an output of 500 W so as to obtain a sponge cake. The sponge cake exhibited a fine, uniform sponge texture and was found to be soft and satisfactory in the melting in the mouth. Also, the sponge cake maintained the swollen state immediately after cooking.

EXAMPLE 3

A cake premix of the composition given below was mixed by an ordinary method so as to obtain a cake premix for cooking by a microwave oven:

| | |
|---|---|
| Tapioca starch | 6 g |
| Pregelatinized tapioca starch | 5 g |
| Sugar | 18 g |
| Baking powder | 3 g |
| Powdered fat and oil | 4 g |
| Table salt | 0.2 g |

The cake mix thus prepared was put in a substantially cylindrical porcelain mug cup having a diameter of 8 cm, a depth of 8 cm and an inner volume of 330 ml, followed by adding about 50 g of chicken egg and sufficiently stirring the resultant mixture so as to prepare a cake batter. The viscosity of the batter was found to be 253 Pa·s. Then, the batter was heated for 1 minute and 40 seconds in a microwave oven having an output of 600 W so as to obtain a sponge cake. The sponge cake exhibited a uniform and very fine sponge texture and was found to be soft and satisfactory in the melting in the mouth. Also, the sponge cake maintained the swollen state immediately after the cooking.

EXAMPLE 4

A cake premix of the composition given below was mixed by an ordinary method so as to obtain a cake premix for cooking by a microwave oven:

| | |
|---|---|
| Rice starch | 6 g |
| Pregelatinized wheat starch | 5 g |
| Sugar | 18 g |
| Baking powder | 3 g |
| Powdered fat and oil | 4 g |
| Table salt | 0.2 g |

The cake mix thus prepared was put in a substantially cylindrical porcelain mug cup having a diameter of 8 cm, a depth of 8 cm and an inner volume of 330 ml, followed by adding about 50 g of chicken egg and sufficiently stirring the resultant mixture so as to prepare a cake batter. The viscosity of the batter was found to be 239 Pa·s. Then, the batter was heated for 1 minute and 40 seconds in a microwave oven having an output of 600 W so as to obtain a sponge cake. The sponge cake exhibited a fine, uniform sponge texture and was found to be satisfactory in the melting in the mouth. Also, the sponge cake maintained the swollen state immediately after cooking.

EXAMPLE 5

A cake premix of the composition given below was mixed by an ordinary method so as to obtain a cake premix for cooking by a microwave oven:

| | |
|---|---|
| Phosphate crosslinked wheat starch | 40 g |
| Pregelatinized wheat starch | 10 g |
| Pregelatinized corn starch | 10 g |
| Sugar | 80 g |
| Baking powder | 10 g |
| Powdered fat and oil | 10 g |
| Cellulose | 6 g |

The cake mix thus prepared was put in a substantially cylindrical polypropylene cake box having a diameter of 15 cm, a depth of 7 cm and an inner volume of 1200 ml, followed by adding about three 50 g chicken eggs and 30 ml of milk, and sufficiently stirring the resultant mixture so as to prepare a cake batter. The viscosity of the batter was found to be 280 Pa·s. Then, the batter was heated for 3 minutes and 30 seconds in a microwave oven having an output of 500 W so as to obtain a sponge cake. The upper surface of the cake was substantially flat and the sponge cake exhibited a fine, uniform sponge texture. The bake shrinkage of the cake was not found, and the cake maintained it's shape immediately after cooking. Also, the cake was found to be satisfactory in the melting in the mouth.

EXAMPLE 6

A cake premix of the composition given below was mixed by an ordinary method so as to obtain a cake premix for cooking by a microwave oven:

| | |
|---|---|
| Wheat starch | 50 g |
| Pregelatinized wheat starch | 10 g |
| Pregelatinized corn starch | 10 g |
| Sugar | 70 g |
| Baking powder | 10 g |
| Powdered fat and oil | 10 g |
| Wheat bran | 7 g |
| Whey protein | 30 g |

The cake mix thus prepared was put in a substantially cylindrical polypropylene cake box having a diameter of 15 cm, a depth of 7 cm and an inner volume of 1200 ml, followed by adding 100 ml of water and sufficiently stirring the resultant mixture so as to prepare a cake batter. The viscosity of the batter was found to be 269 Pa·s. Then, the batter was heated for 3 minutes and 30 seconds in a microwave oven having an output of 600 W so as to obtain a sponge cake. The upper surface of the cake was substantially flat and the sponge cake exhibited a fine, uniform sponge texture. The bake shrinkage of the cake was not found, and the cake maintained it's shape immediately after cooking. Also, the cake was found to be satisfactory in the melting in the mouth.

EXAMPLE 7

A cake premix of the composition given below was mixed by an ordinary method so as to obtain a cake premix for cooking by a microwave oven:

| | |
|---|---|
| Corn starch | 50 g |
| Pregelatinized potato starch | 20 g |
| Sugar | 70 g |
| Baking powder | 10 g |
| Powdered fat and oil | 10 g |
| Sugar beet fiber | 10 g |

The cake mix thus prepared was put in a substantially cylindrical polypropylene cake box having a diameter of 15 cm, a depth of 7 cm and an inner volume of 1200 ml, followed by adding about three 50 g chicken eggs and 30 ml of milk and sufficiently stirring the resultant mixture so as to prepare a cake batter. The viscosity of the batter was found to be 244 Pa·s. Then, the batter was heated for 3 minutes in a microwave oven having an output of 600 W so as to obtain a sponge cake. The upper surface of the cake was substantially flat and the sponge cake exhibited a uniform and fine sponge texture. The bake shrinkage of the cake was not found, and the cake maintained the shape immediately after the cooking. Also, the cake was found to be satisfactory in the melting in the mouth.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A premix comprising a main ingredient of a cereal powder, to be cooked into a sponge cake, by mixing a thermocoagulator protein to the premix, stirring the mixture and heating the mixture, wherein said cereal powder comprises starch and pregelatinized starch.

2. The premix according to claim 1, wherein the starch comprises at least one selected from the group consisting of wheat starch, corn starch, tapioca starch, potato starch, rice starch and modified starches excluding pregelatinized starch, said modified starches being prepared by using these starches as the raw materials.

3. The premix according to claim 1, wherein the pregelatinized starch comprises at least one selected from the group consisting of pregelatinized wheat starch, pregelatinized corn starch, pregelatinized tapioca starch, pregelatinized waxy corn starch and pregelatinized patato starch.

4. The premix according to claim 1, wherein the pregelatinized starch is contained in an amount of 25 to 55% by weigh based on the amount of the cereal powder.

5. The premix according to claim 1, wherein the thermocoagulation protein is one selected from the group consisting of albumen, casein and whey protein.

6. The premix according to claim 1, further comprising at least one of water-insoluble dietary fiber selected from the group consisting of cellulose, wheat bran and sugar beet fiber.

7. A method of preparing a sponge cake by heating with a microwave oven a batter stirring resulant mixture obtained by mixing a thermocoagulation protein, milk and/or water to a premix comprising main ingredients of starch and pregelatinized starch.

8. The sponge cake preparing method according to claim 7, wherein the starch comprises at least one selected from the group consisting of wheat starch, corn starch, tapioca starch, potato starch, rice starch and modified starches excluding pregelatinized starch, said modified starches being prepared by using these starches as the raw materials.

9. The sponge cake preparing method according to claim 7, wherein the pregelatinized starch comprises at least one selected from the group consisting of pregelatinized wheat starch, pregelatinized corn starch, pregelatinized tapioca starch, pregelatinized waxy corn starch and pregelatinized potato starch.

10. The sponge cake preparing method according to claim 7, wherein the pregelatinized starch is contained in an amount of 25 to 55% by weight based on the amount of the cereal powder.

11. The sponge cake preparing method according to claim 7, wherein the thermocoagulation protein is one selected from the group consisting of albumen, casein and whey protein.

12. The sponge cake preparing method according to claim 7, further comprising a step of adding at least one of water-insoluble dietary fiber selected from the group consisting of cellulose, wheat bran and sugar beet fiber, to the premix.

13. A batter prepared by adding a thermocoagulation protein liquid and at least one of milk and water to a premix containing as a main ingredient a cereal powder consisting of starch and a pregelatinized starch, said batter having a viscosity of 100 to 300 Pa·s.

14. A batter prepared by adding at least one of a a thermocoagulation protein liquid, milk and water to a premix containing as main ingredients starch, a pregelatinized starch, and a thermocoagulation protein, said batter having a viscosity of 100 to 300 Pa·s.

15. A method of preparing a sponge cake by stirring the raw materials containing as main ingredients a cereal powder and protein to prepare a batter, followed by heating the batter with a microwave oven, wherein said cereal powder includes starch and a pregelatinized starch, said protein is selected from the group consisting of a thermocoagulation protein liquid, a combination of a thermocoagulation protein liquid and milk, a combination of a thermocoagulation protein liquid and water, a combination of a thermocoagulation protein liquid, milk and water, a combination of a thermocoagulation protein and milk, a combination of a thermocoagulation protein and water, and a combination of a thermocoagulation protein, milk and water, and said batter has a viscosity of 100 to 300 Pa·s.

16. The method of preparing a sponge cake according to claim 15, wherein at least one water-insoluble dietary fiber selected from the group consisting of cellulose, wheat bran and sugar beet fiber is added to said raw materials.

* * * * *